United States Patent
Nishiyama et al.

(10) Patent No.: US 8,532,905 B2
(45) Date of Patent: Sep. 10, 2013

(54) FUEL-EFFICIENT DRIVING SYSTEM

(75) Inventors: Yoshitaka Nishiyama, Okegawa (JP); Tomoki Kubo, Ageo (JP)

(73) Assignee: UD Trucks Corporation, Saitama (JP)

( * ) Notice: Subject to any disclaimer, the term of this patent is extended or adjusted under 35 U.S.C. 154(b) by 160 days.

(21) Appl. No.: 13/133,035

(22) PCT Filed: Dec. 2, 2009

(86) PCT No.: PCT/JP2009/070218
§ 371 (c)(1),
(2), (4) Date: Jun. 6, 2011

(87) PCT Pub. No.: WO2010/064645
PCT Pub. Date: Jun. 10, 2010

(65) Prior Publication Data
US 2011/0238278 A1    Sep. 29, 2011

(30) Foreign Application Priority Data
Dec. 4, 2008    (JP) ................. 2008-309240

(51) Int. Cl.
*B60T 8/32* (2006.01)
(52) U.S. Cl.
USPC .......................................... 701/93

(58) Field of Classification Search
USPC ............... 701/93, 96, 99, 103, 104, 123, 412, 701/540
See application file for complete search history.

(56) References Cited

U.S. PATENT DOCUMENTS

| 7,377,256 B2 | 5/2008 | Glora | |
|---|---|---|---|
| 2009/0216415 A1* | 8/2009 | Iwatsuki et al. | 701/70 |

FOREIGN PATENT DOCUMENTS

| JP | 2000-306200 A | 2/2000 |
|---|---|---|
| JP | 2000-308200 | * 11/2000 |
| JP | 2005-132356 A | 5/2005 |
| JP | 2007-156704 A | 6/2007 |
| JP | 2007-159704 | * 6/2007 |
| JP | 2007-170274 A1 | 7/2007 |

* cited by examiner

Primary Examiner — Kim T Nguyen
(74) Attorney, Agent, or Firm — Smith Patent Office (57) ABSTRACT

A fuel-saving driving system which gradually decreases a target vehicle speed from a start of control to passage of a descending-slope starting point in a linear form and can obtain fuel-saving and smooth driving feeling without repeating fuel-cut and injection. A vehicle-position specifying device is provided for specifying the position of a vehicle, a storage device for storing data of a descending slope located in the vehicle traveling direction, a vehicle speed measuring device for measuring a speed of the vehicle, and a controller The controller has a function of determining a target speed of the vehicle from the vehicle speed and the data of the descending slope.

4 Claims, 5 Drawing Sheets

FUEL-EFFICIENT DRIVING SYSTEM

The present invention relates to an automatic control system for fuel-saving driving of an automobile and particularly to automatic control which can further reduce fuel consumption when driving changes to descending.

BACKGROUND OF THE INVENTION

As a prior art, a fuel-saving system that effectively promotes fuel-saving driving using road gradient information and a control method thereof are disclosed (See Patent Document 1, for example).

In the prior art (Patent Document 1), improvement in fuel efficiency is promoted by using acceleration energy on a descending slope or in more detail by performing speed-reduction control before the descending slope.

In the prior art (Patent Document 1), an advice position for fuel-cut before the descending slope (a position where an advice is given to a driver) or a control position for fuel-cut in an automatic fuel-saving driving system (a position where fuel is cut by automatic control) is determined by a vehicle speed (a car speed), a gradient before the descending slope and the gradient of the descending slope. And the gradient before the descending slope and the gradient of the descending slope are determined by a three-dimensional map.

Thus, in order to reduce the speed to a targeted vehicle speed at start of the descending slope, the gradient before the descending slope and the gradient of the descending slope need to be mapped precisely, and the advice position for fuel-cut or the control position for fuel-cut in the automatic fuel-saving driving system also need to be mapped precisely.

However, even if the map is to be improved precisely, the gradient at an actual traveling position is not necessarily constant.

Also, in the case of a cargo vehicle, its mass is greatly varied whether the vehicle is empty or loaded, and thus, deceleration is largely different at the fuel-cut between the empty vehicle and the loaded vehicle, and it has been difficult to reduce the speed to a requested vehicle speed (target vehicle speed) at start of the descending slope both in the empty vehicle and the loaded vehicle.

Here, in the case of the automatic fuel-saving driving mode, at a requested vehicle speed or less, control is performed such that fuel is automatically injected so that the vehicle speed is not reduced excessively. Because of such control, fuel might be injected immediately before entering the descending slope, and in that case, a vehicle behavior becomes jerky, and a driver would have a sense of discomfort, which is a problem. At the same time, there is also a problem of a bad influence on the fuel efficiency.

Figure 5:
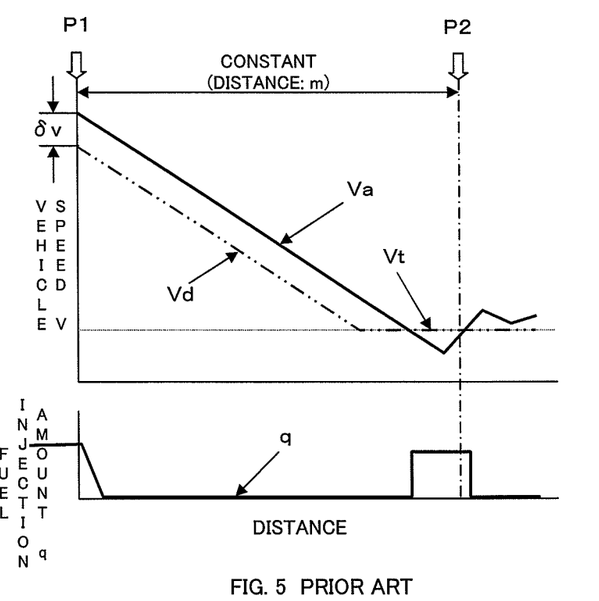
FIG. 5 is a diagram illustrating characteristics of a traveling distance, a vehicle speed, and fuel injection when changing from ascending a slope to descending a slope in a prior art.

FIG. 5 shows a traveling distance, a vehicle speed and a fuel injection amount in the control at a point to change to descending during the automatic fuel-saving driving according to the prior art.

In FIG. 5, reference character P1 denotes a control start position, reference character P2 for a peak point changing from ascending to descending (descending-slope starting point), reference character Vd for a requested vehicle speed, reference character Va for an actual vehicle speed, reference character Vt for a target vehicle speed when entering the descending slope, and reference character q for a fuel injection amount. Here, a distance from the control starting point to a descending starting point is 300 m (constant), for example.

In FIG. 5, reference character by indicates a difference between the actual vehicle speed Va and the target vehicle speed Vd.

FIG. 5 shows a case in which the gradient on the ascending side is steeper than that in data stored in a database or a vehicle mass is small.

In the case shown in FIG. 5, the speed is lost before reaching the descending-slope starting point P2, and the vehicle speed Va becomes lower than the target vehicle speed Vt at entering the descending slope. Thus, the fuel injection amount q is temporarily injected. By means of this temporary fuel injection q, the vehicle speed Va rapidly increases and becomes higher than the target vehicle speed Vt at entering the descending slope, but since fuel is cut immediately after the fuel injection amount q is temporarily injected, the vehicle speed Va is decreased again.

As a result, a driving feeling before and after the descending-slope starting point P2 becomes jerky, and fuel efficiency is deteriorated by the temporary fuel injection.

Figure 6:
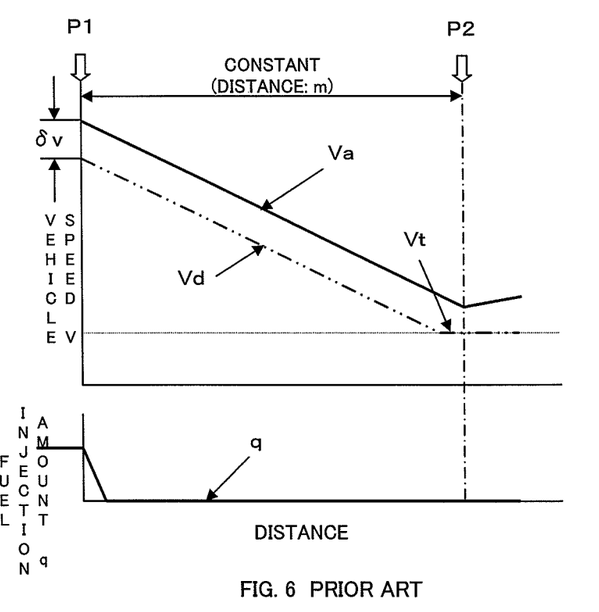
FIG. 6 is a diagram illustrating characteristics of a traveling distance, a vehicle speed, and fuel injection when changing to descending a slope in a prior art different from that in FIG. 5.

FIG. 6 shows the traveling distance, the vehicle speed, and the fuel injection amount in control at a point of time changing from ascending to descending in the automatic fuel-saving driving of the prior art as well as shown in FIG. 5. However, FIG. 6 shows a case in which the gradient on the actual ascending side is gentler than that in the data stored in the database or the vehicle mass is larger.

In the case shown in FIG. 6, the actual vehicle speed Va does not fully slow down but the actual vehicle speed Va at the descending-slope starting point P2 exceeds the target vehicle speed Vt at entering the descending slope and a frequency of operating an auxiliary brake in the middle of the slope is increased, which deteriorates the fuel efficiency.

Figure 7:
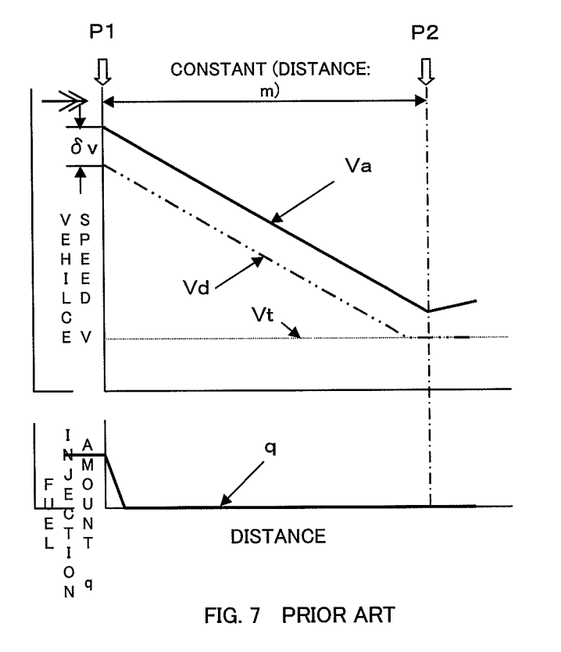
FIG. 7 is a diagram illustrating characteristics of a traveling distance, a vehicle speed, and fuel injection when changing from ascending a slope to descending a slope in a prior art different from that in FIGS. 5 and 6.

FIG. 7 shows a case in which in order to solve the problem in FIG. 5, the control start position P1 is brought close to the descending-slope starting point P2 and the distance from the control starting point to the descending starting point is set short.

In FIG. 7, it is not necessary to temporarily inject the fuel injection amount q before reaching the descending-slope starting point P2 as in the case shown in FIG. 5. However, similarly to the case shown in FIG. 6, the actual vehicle speed Va at the descending-slope starting point P2 exceeds the target vehicle speed Vt at entering the descending slope, and the frequency of operating the auxiliary brake in the middle of the descending slope is increased and thus, the problem of deterioration in fuel efficiency still remains.

Patent Document 1: JPA (Non-examined publication) No. 2007-156704

SUMMARY OF THE INVENTION

Problem to be solved

The present invention was created in view of the above-mentioned problems of the prior art and has an object for providing a fuel-saving driving system in which a target vehicle speed from start of control to passage of a descending-slope starting point is gradually decreased linearly, and a smooth driving feeling can be obtained without repeating fuel-cut and injection while saving fuel consumption.

Solution Means for Problem

A fuel-saving driving system (100) of the present invention has a vehicle-position specifying device (2: GPS, for example) which specifies the position of a vehicle, a storage device (database 11, for example) which stores data of a descending slope located in the vehicle traveling direction, a vehicle speed measuring device (vehicle speed sensor 3) which measures a speed (vehicle speed Va) of a vehicle (1), and a controller (controller of the fuel-saving driving system side: control unit 10), the controller (10) has a function of determining (calculating) a target speed (requested vehicle speed Vd) of the vehicle (1) from the vehicle speed (Va) and the data of the descending slope (a distance L from the current position to the descending-slope starting point and the target vehicle speed Vt at the descending-slope starting point and the like, for example) (claim 1).

In the present invention, the controller (controller of the fuel-saving driving system side: control unit 10) preferably has a function of calculating the target speed (Vd) at a spot where the vehicle (1) is traveling on the basis of the vehicle speed (Va) at the spot where the vehicle (1) is traveling and the distance (L) to the descending-slope starting point so that the speed (Va) of the vehicle (1) at a point of time when the vehicle (1) reaches the descending-slope starting point (P2) becomes the target speed (Vt) at the descending-slope starting point (claim 2).

Here, the controller (controller of the fuel-saving driving system side: control unit 10) preferably has a function of executing control of decreasing the target speed (Vd) at the spot where the vehicle (1) is traveling gradually (so that the deceleration characteristic becomes linear) so that the speed (Va) of the vehicle at the point of time when the vehicle (1) reaches the descending-slope starting point (P2) becomes the target speed (Vt) at the descending-slope starting point P2 (claim 3).

Said controller (controller of the fuel-saving driving system side: control unit 10) preferably has a function of transmitting a control signal to a vehicle-side controller (engine controller 4) that controls an engine via an information network (5) of the vehicle so as to have the vehicle-side controller (4) transmit a control signal to inject fuel in an injection amount corresponding to the control signal to a fuel injecting device (claim 4).

Advantageous Effects of Invention

According to the present invention provided with the above-mentioned constructions, since the present invention is constructed to determine (calculate) the target speed (requested vehicle speed Vd) of the vehicle from the vehicle speed (Va) and the data of the descending slope (the distance L from the current position to the descending-slope starting point, the target vehicle speed Vt at the descending-slope starting point and the like), the target speed (Vd) at the spot where the vehicle (1) is traveling can be decreased linearly (claim 2), and the target speed (Vd) at the spot where the vehicle (1) is traveling can be decreased linearly (gradually) (claim 3), repetition of fuel-cut and fuel injection before the descending-slope starting point P2 can be suppressed.

That is, the fuel-cut or the fuel injection makes a vehicle behavior unstable (jerky) and gives a sense of unstableness or a sense of discomfort to a vehicle passenger, but since the repetition of fuel-cut and fuel injection is suppressed in the present invention, a sense of unstableness or a sense of discomfort is prevented from being given to the vehicle passenger.

Moreover, according to the present invention, since the target speed (Vd) at the spot where the vehicle (1) is traveling can be decreased linearly (gradually) (claim 3), a starting point (P1) where the vehicle traveling speed (Va) is decreased can be set at a position away from the descending-slope starting point (P2) as compared with the prior art.

That is, since the distance for which the vehicle (1) travels with a decreased speed (the distance L from the point P1 where deceleration is started to the descending-slope starting point P2) can be made longer than that in the prior art, deviation between the vehicle speed (Va) and the target speed (V) at the descending-slope starting point becomes smaller even in the case shown in FIG. 6, and a frequency of braking in the middle of the descending slope becomes fewer. Thus, energy is not wasted by braking and fuel efficiency of the vehicle is improved. Also, since the distance for which the vehicle can travel while being subjected to braking can be made shorter, the fuel-saving effect can be exerted further effectively.

DESCRIPTION OF EMBODIMENTS

An embodiment of the present invention will be described below by referring to the attached drawings.

Figure 1:
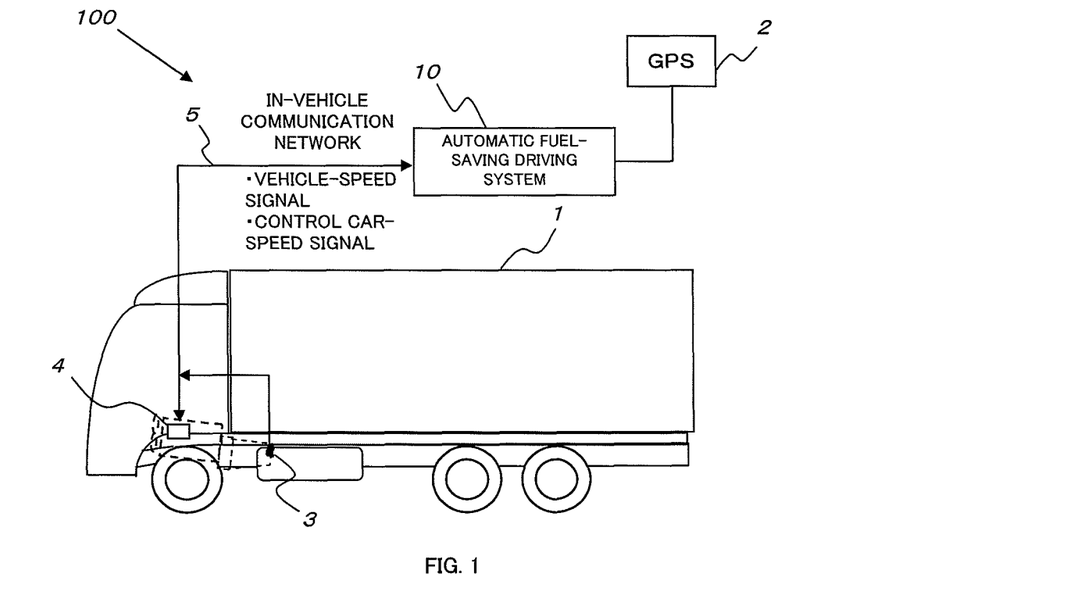
FIG. 1 is a block diagram illustrating an embodiment of the present invention.

In FIG. 1, a fuel-saving driving system according to the embodiment of the present invention is indicated in entirety by reference numeral 100.

The fuel-saving driving system 100 has a vehicle 1, a GPS 2, which is a vehicle position specifying device, a vehicle speed sensor 3, an engine controller 4, an in-vehicle communication network 5, and a control unit 10, which is control means of the automatic fuel-saving driving system.

In this embodiment, the position of the vehicle is specified by using a Global Positioning System, and the GPS 2, which is a vehicle position specifying device, receives position information or the like from a satellite of the Global Positioning System.

The in-vehicle communication network 5 connects the control unit 10 to the vehicle speed sensor 3 and the engine controller 4.

Figure 2:
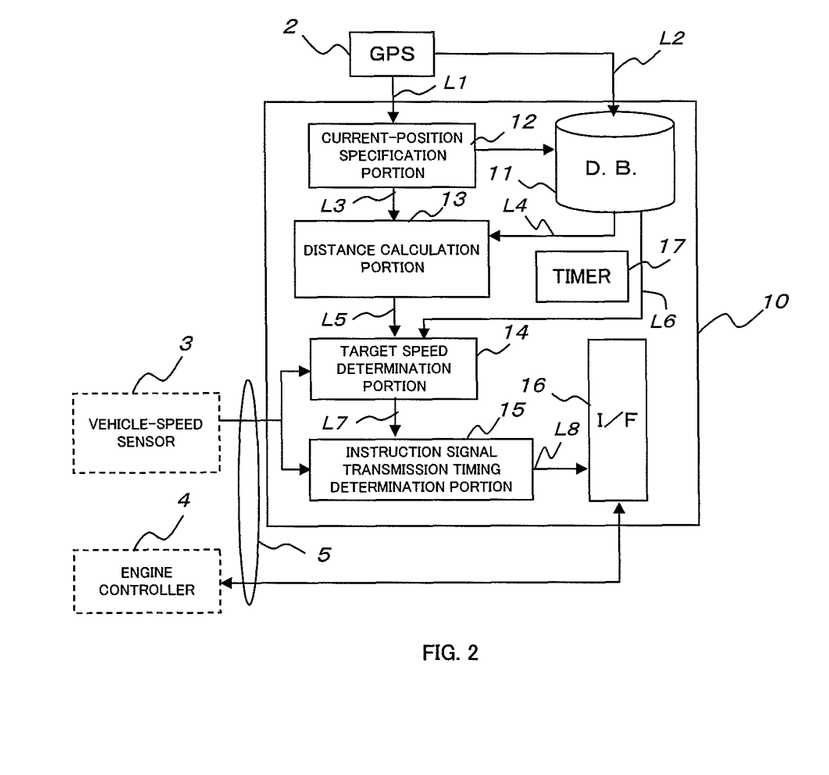
FIG. 2 is a block diagram of a controller used in the embodiment.

FIG. 2 illustrates a construction of the control unit 10.

In FIG. 2, the control unit 10 has a database 11, a current-position specification portion 12, a calculation portion (distance calculation portion) 13 for calculating a distance from the current position to a descending-slope starting point, a target-speed determination portion 14, an instruction-signal transmission timing determination portion 15, and an interface 16.

The information relating to the current position of the vehicle from the GPS 2 is inputted into the current-position specification portion 12 via a line L1.

In the database 11, map data obtained by a requested vehicle speed (target vehicle speed) at the descending-slope starting point and the information obtained so far from the GPS, for example, is stored. If the map data stored in the database 11 is to be updated, new map data is sent from the GPS 2 to the database 11 via the line L2.

The distance calculation portion 13 is constructed to have a function of calculating the distance "L" (See FIG. 3) from the (current position of the) vehicle 1 to the descending-slope starting point from the current position information of the vehicle 1 obtained from the current-position specification portion 12 via a line L3 and the map information obtained from the database 11 via a line L4.

Into the target-speed determination portion 14, the distance L from the current position to the descending-slope starting point calculated by the distance calculation portion 13 is inputted via a line L5. Also, into the target-speed determination portion 14, the current vehicle speed Va measured by the vehicle speed sensor 3 is inputted via the in-vehicle communication network 5. Moreover, into the target-speed determination portion 14, the requested vehicle speed (target vehicle speed when entering the descending slope) Vt at the descending-slope starting point stored in the database 11 is inputted via a line L6.

The target-speed determination portion 14 has a function of calculating the requested vehicle speed (target vehicle speed) Vd on the basis of the distance L from the current position to the descending-slope starting point, the current vehicle speed Va, and the target vehicle speed Vt when entering the descending slope.

The instruction-signal transmission timing determination portion 15 has a function of determining timing at which a control signal to achieve the target vehicle speed Vd is transmitted.

If the target vehicle speed Vd determined by the target-speed determination portion 14 is inputted via a line L7, the instruction-signal transmission timing determination portion 15 transmits a control signal (control signal to achieve the target vehicle speed Vd) to the engine controller 4 via a line L8, an interface 16, and the in-vehicle communication network 5 in accordance with the timing determined by the instruction-signal transmission timing determination portion 15.

Then, the engine controller 4 transmits the control signal to a fuel injecting device, not shown, and adjusts or controls a fuel injection amount and injection timing so that the vehicle speed becomes the target vehicle speed Vd.

In FIG. 2, a timer 17 measures a control interval. In the control unit 10, the distance "L" from the current position of the vehicle to the descending-slope starting point and the target vehicle speed (requested vehicle speed; Vd) are calculated at every predetermined control interval measured by the timer 17.

As described above, in the prior art, when changing from ascending to descending, from a constant distance (300 m, for example) before the descending-slope starting point, the speed (requested vehicle speed) of the vehicle 1 is determined and the fuel injection amount is adjusted on the basis of the gradient on the ascending side and the gradient on the descending side of the spot (according to the map information stored in the database) and the vehicle speed at the start of control (300 m before the descending-slope starting point) and so that the vehicle can travel on the ascending slope to the descending-slope starting point.

However, as described above by referring to FIGS. 5 to 7, there were cases in which the speed is lost before the descending-slope starting point P2 due to the difference between the gradient information of the database and the actual gradient and the vehicle weight and the fuel injection amount is temporarily injected (FIG. 5) or in which the actual vehicle speed at the descending-slope starting point P2 exceeds the target vehicle speed when entering the descending slope and an auxiliary brake is operated (FIGS. 6 and 7).

Thus, the purpose of improving fuel efficiency cannot be achieved in some cases.

In order to cope with that, in the fuel-saving driving system 100 according to the illustrated embodiment, the speed (requested vehicle speed) of the vehicle 1 is determined on the basis of the actual vehicle speed Va from the vehicle speed sensor 3, the target vehicle speed Vt when entering the descending slope, and the distance L from the current position to the descending-slope starting point, and the fuel injection amount is adjusted. Also, in the fuel-saving driving system 100 according to the illustrated embodiment, since the speed is decreased linearly (gradually) so that the target vehicle speed Vt is achieved at a descending-slope starting point P2A, the situation in which the vehicle speed Va falls under the target vehicle speed Vt when entering the descending slope at a stage before reaching the descending-slope starting point P2A (See FIG. 5) can be prevented.

Similarly, in the fuel-saving driving system 100 according to the illustrated embodiment, since the distance for which the vehicle 1 travels at a reduced speed (the distance L from the point P1 where deceleration is started to the descending-slope starting point P2A) can be made longer than that in the prior art, the situation in which the speed is not fully decreased before reaching the descending-slope starting point P2A and the vehicle speed Va largely exceeds the target vehicle speed Vt when entering the descending slope at the descending-slope starting point P2A (See FIGS. 6 and 7) can be prevented.

That is, according to the illustrated embodiment, since the distance L to the descending-slope starting point P2A is considered, the requested vehicle speed Vd of the vehicle 1 can be determined by considering whether or not the vehicle speed Va at the current position is appropriate for achieving the target vehicle speed Vt when entering the descending slope.

Thus, an error between the vehicle speed Va at the descending-slope starting point P2A and the target vehicle speed Vt when entering the descending slope can be made small.

In other words, according to the illustrated embodiment, since in each control cycle, the speed when the vehicle 1 moves from the current position to the descending-slope starting point P2A can be expected by considering the distance L to the descending-slope starting point P2A, the requested vehicle speed or the target vehicle speed Vd of the vehicle 1 can be determined by referring to the expected value. This means that the requested vehicle speed or the target vehicle speed Vd of the vehicle 1 can be corrected at every control cycle.

Therefore, in the illustrated embodiment, even if the distance from the point P1A where the control is started to the descending-slope starting point P2A is long, the fuel injection amount is adjusted by correcting the requested vehicle speed or the target vehicle speed Vd at every control cycle and thus, an error between the vehicle speed Va at the descending-slope starting point P2A and the target vehicle speed Vt when entering a descending slope can be made small by reducing an error between the vehicle speed Va and the target vehicle speed Vt when entering a descending slope.

In the illustrated embodiment, as a numerical value of the distance L from the point P1A where the control is started to the descending-slope starting point P2A, 400 to 500 m, for example, can be set.

On the basis of the flowchart in FIG. 4 and also by referring to FIGS. 2 and 3, control of the fuel-saving driving system 100 will be described.

Figure 3:
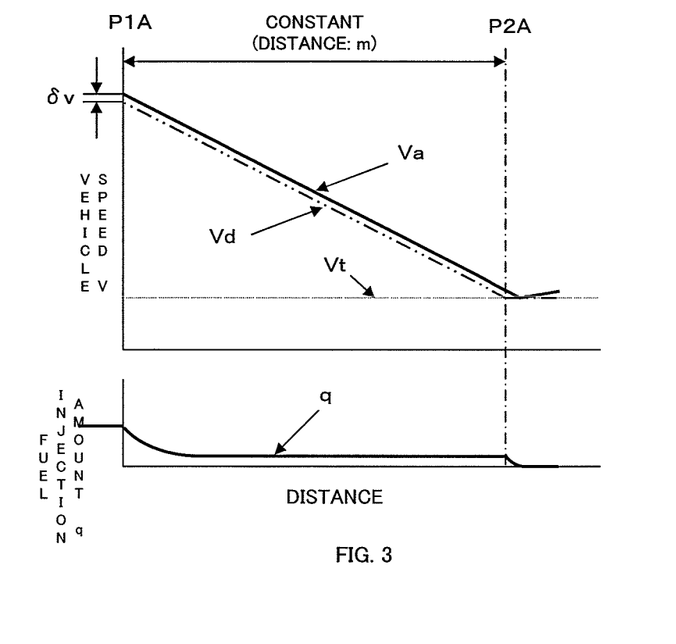
FIG. 3 is a diagram illustrating characteristics of a traveling distance, a vehicle speed, and fuel injection when changing from ascending a slope to descending a slope in a fuel-saving driving system according to the embodiment.
Figure 4:
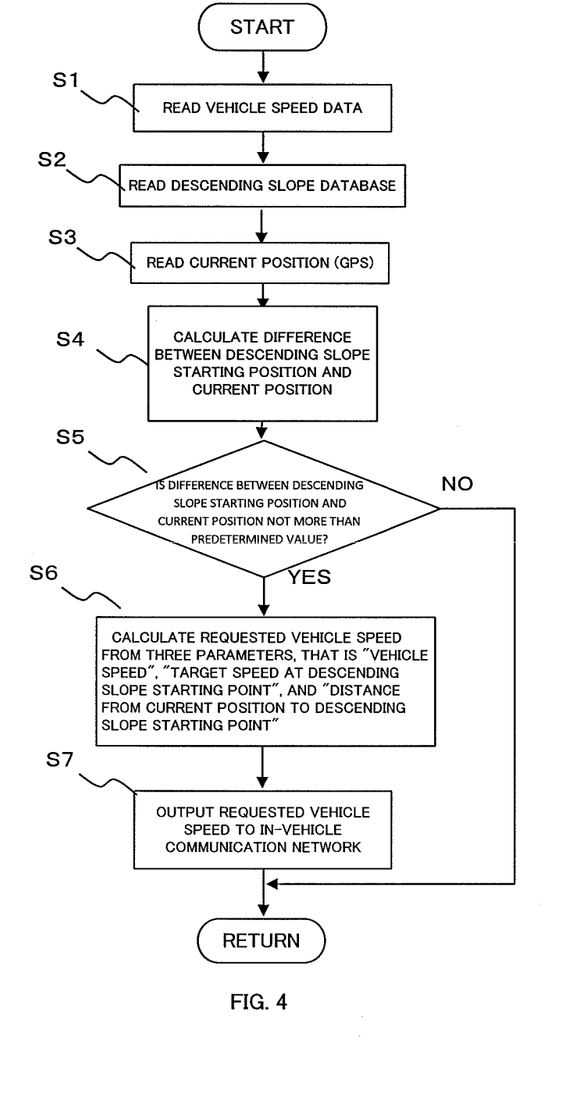
FIG. 4 is a flowchart illustrating driving control according to the embodiment.

In FIG. 4, the control unit 10 reads the vehicle speed data (Step S1) from the information from the vehicle speed sensor 3, the position information (Step S2) of the descending-slope starting point P2A (See FIG. 3) during traveling from the database 11, and reads the current position of the vehicle 1 from the GPS 2. (Step S3).

The order of reading each data, that is, the order of Steps S1 to S3 is not limited by the above. Also, Steps S1 to S3 can be executed at the same time.

At Step S4, on the basis of the position information of the descending-slope starting point P2A (Step S2) during traveling and the current position of the vehicle 1 (Step S3), the distance calculation portion 13 calculates the distance L between the descending-slope starting point P2A and the current position.

At Step S5, the control unit 10 determines whether or not the distance L between the descending-slope starting point P2A and the current position is not more than a constant (400 to 500 m, for example).

If the distance L between from the current position to the descending slope starting point P2A is not more than the constant (YES for Step S5), the routine proceeds to Step S6.

On the other hand, if the distance L from the current position to the descending slope starting point P2A is larger than the constant (NO for Step S5), Step S1 and after is repeated.

At Step S6, using parameters of the vehicle speed Va, the target vehicle speed Vt when entering the descending slope, and the distance L from the current position P1 to the descending slope starting point P2, the requested vehicle speed (target vehicle speed) Vd is calculated. Then, the routine proceeds to Step S7.

At Step S7, a control signal for controlling the fuel injection amount so that the requested vehicle speed Vd is achieved is outputted to the engine controller 4 via the in-vehicle communication network 5. Then, the engine controller 4 transmits a control signal relating to the fuel injection amount to the fuel injecting device, not shown, so as to achieve the requested vehicle speed Vd.

Then, Step S1 and after is repeated.

As described above, the illustrated fuel-saving driving system 100 is constructed to determine the target vehicle speed (requested vehicle speed Vd) from the vehicle speed Va, the data of the descending slope (the position of the descending-slope starting point P2A and the target vehicle speed Vt when entering the descending slope, for example) and the distance L from the current position to the descending-slope starting point P2A.

According to the fuel-saving driving system 100 as above, since the target vehicle speed Vd and the vehicle speed Va at a spot where the vehicle 1 is traveling can be controlled as shown in FIG. 3, repetition of fuel-cut and fuel injection before the descending-slope starting point P2A or a frequency at which the auxiliary brake is operated during the descending slope can be suppressed.

Since fuel-cut and fuel injection are not repeated, according to the illustrated fuel-saving driving system 100, the vehicle behavior does not become unstable or jerky or give a sense of unstableness or a sense of discomfort to a driver.

Also, according to the illustrated fuel-saving driving system 100, a frequency at which the auxiliary brake is operated in the middle of the descending slope is reduced. This means full deceleration has been achieved before reaching the descending-slope starting point P2A and also that the fuel consumption is saved in the illustrated fuel-saving driving system 100.

That is, according to the illustrated embodiment, the fuel-saving driving is achieved.

The present invention may be applied to traveling changing from a flat road to the descending slope, for example, other than changing from ascending to descending.

The illustrated embodiment is only an example, and the description is not intended to limit the technical scope of the present invention.

REFERENCE SIGNS LIST 1 vehicle
2 vehicle-position specifying device/GPS
3 vehicle speed measuring device/vehicle speed sensor
4 vehicle-side controller/engine controller
5 vehicle information network
10 controller/control unit
11 storage device/database
12 current-position specification portion
13 calculation portion for distance from current position to descending slope staring point/distance calculation portion
14 target-speed determination portion
15 instruction signal transmission timing determination portion
16 interface
17 timer

The invention claimed is:

1. A fuel-saving driving system comprising:
a vehicle-position specifying device which specifies a position of a vehicle;
a storage device which stores data of a descending slope located in a vehicle traveling direction;
a vehicle speed measuring device which measures a speed of the vehicle; and
a controller;
the controller has a function of determining a target speed of the vehicle from the speed of the vehicle and the data of the descending slope, and
the controller has a function of calculating a target speed at a spot where the vehicle is traveling on a basis of the vehicle speed at the spot where the vehicle is traveling and a distance to a descending-slope starting point so that the speed of the vehicle at a point of time when the vehicle reaches the descending-slope starting point becomes the target speed at the descending-slope starting point.

2. The fuel-saving driving system according to claim 1, wherein
the controller has a function of executing control in which the target speed at the spot where the vehicle is traveling is gradually decreased so that the vehicle speed at the point of time when the vehicle reaches the descending-slope starting point becomes the target speed at the descending-slope starting point.

3. The fuel-saving driving system according to claim 2, wherein
said controller has a function of transmitting a control signal to a vehicle-side controller that controls an engine via an information network of the vehicle and of making the vehicle-side controller transmit a control signal for injecting fuel in an injection amount corresponding to the control signal to a fuel injecting device.

4. The fuel-saving driving system according to claim 1, wherein
said controller has a function of transmitting a control signal to a vehicle-side controller that controls an engine via an information network of the vehicle and of making the vehicle-side controller transmit a control signal for injecting fuel in an injection amount corresponding to the control signal to a fuel injecting device.

* * * * *